Aug. 31, 1943.           H. EICKEMEYER                 2,328,436
                          FILTER APPARATUS
                       Filed Dec. 28, 1939            3 Sheets-Sheet 1
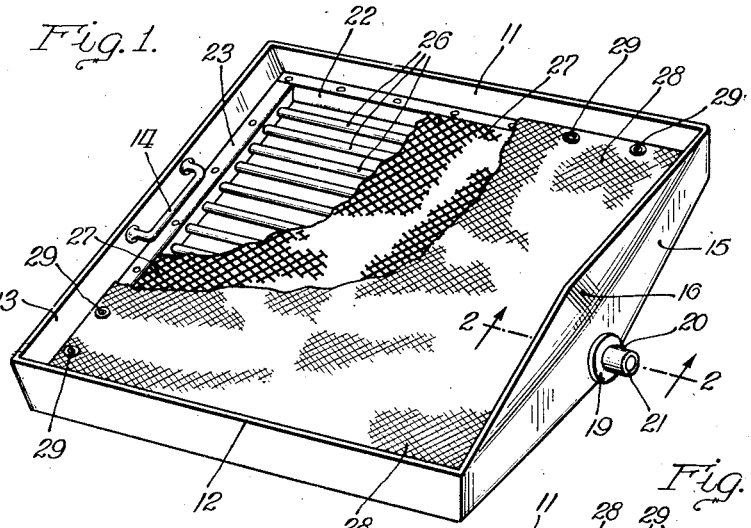
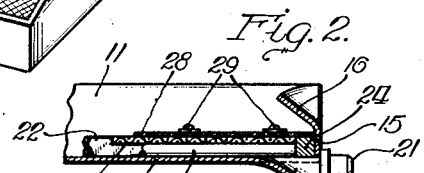
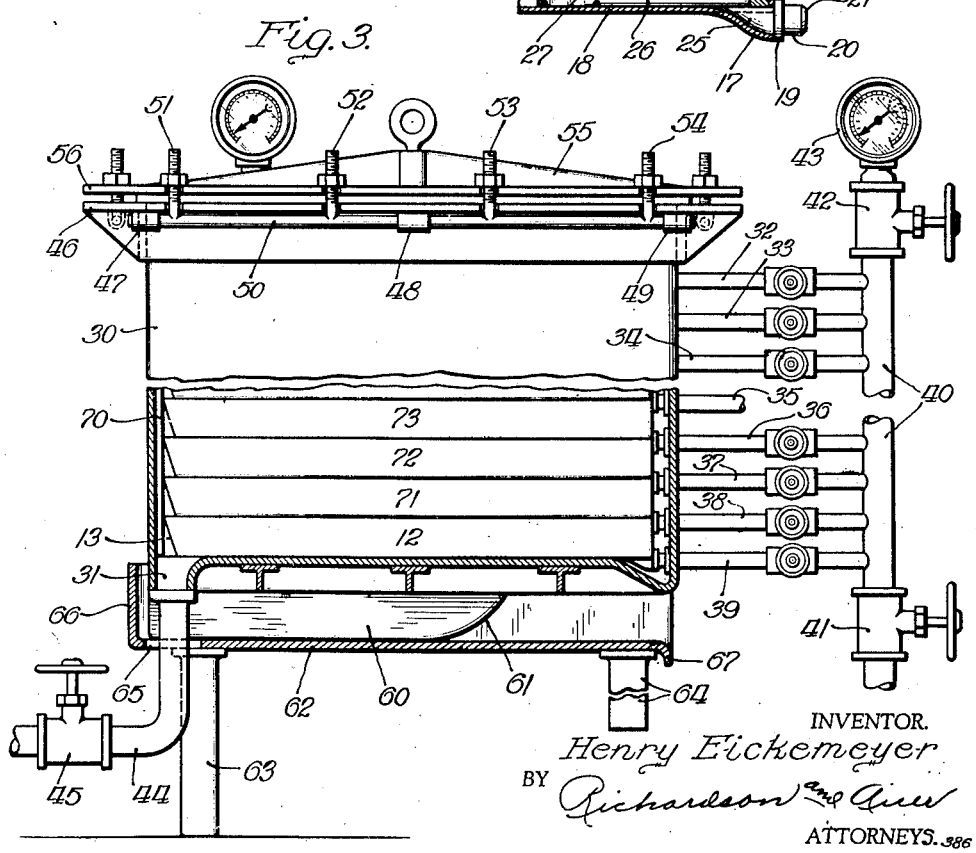
INVENTOR.
Henry Eickemeyer
BY
ATTORNEYS.

Aug. 31, 1943.                H. EICKEMEYER                    2,328,436
                              FILTER APPARATUS
                         Filed Dec. 28, 1939              3 Sheets-Sheet 2
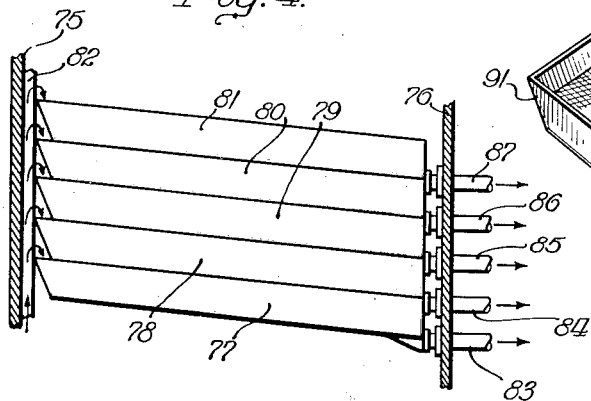
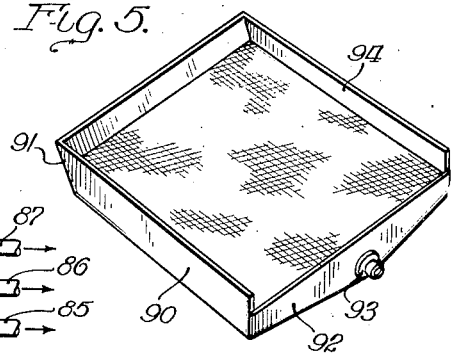
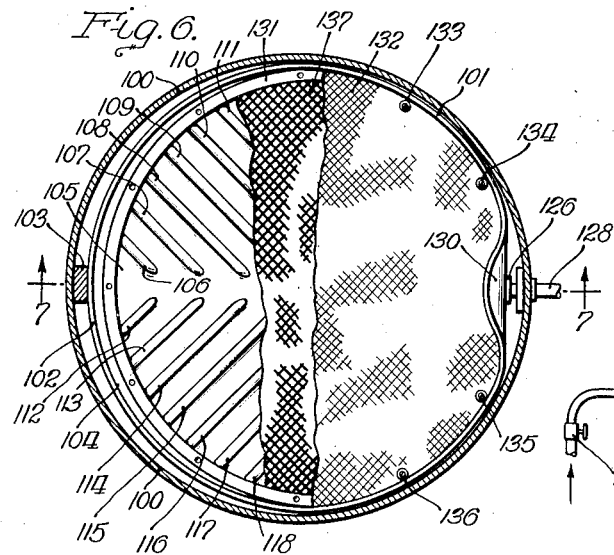
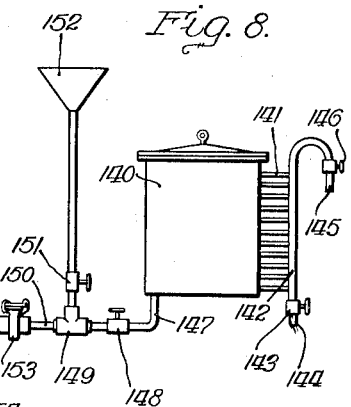
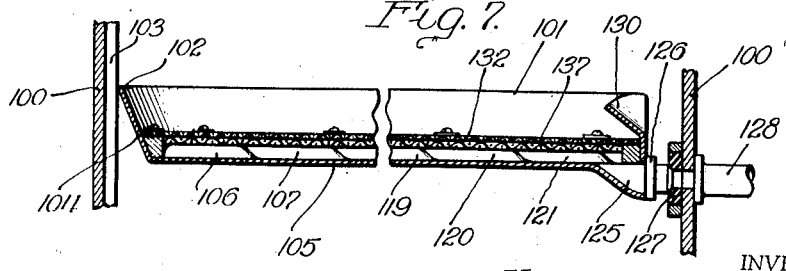
INVENTOR.
Henry Eickemeyer
BY Richardson
ATTORNEYS.

Aug. 31, 1943.                H. EICKEMEYER                2,328,436
                               FILTER APPARATUS
                           Filed Dec. 28, 1939          3 Sheets-Sheet 3
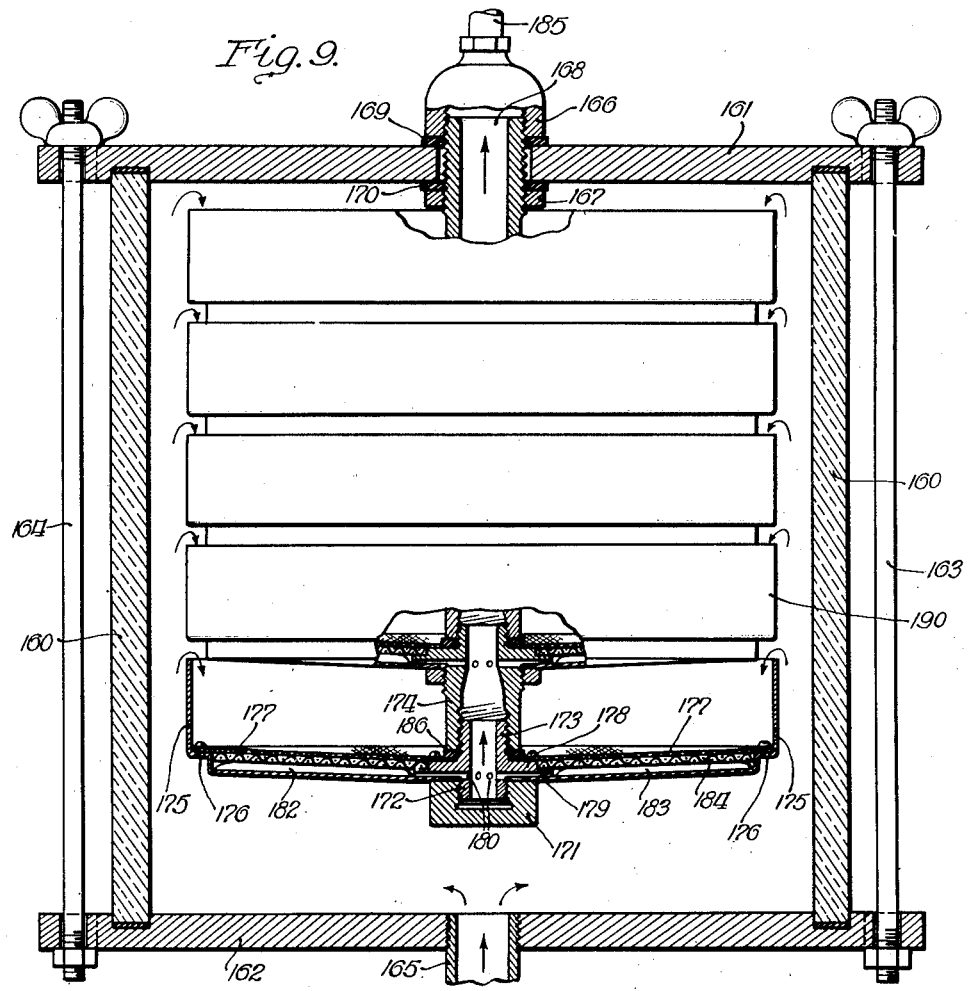
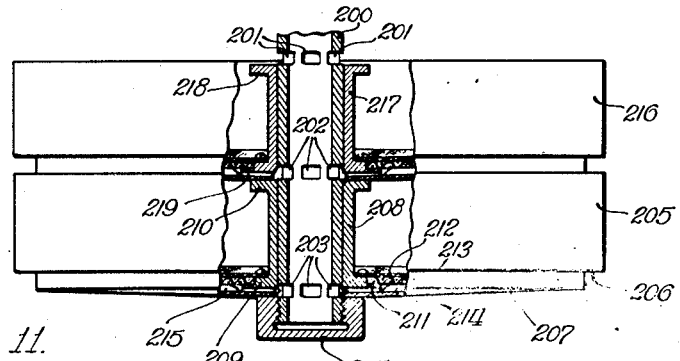
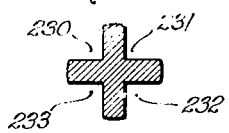
INVENTOR.
Henry Eickemeyer
ATTORNEYS.

Patented Aug. 31, 1943

2,328,436

UNITED STATES PATENT OFFICE 2,328,436

FILTER APPARATUS

Henry Eickemeyer, Chicago, Ill., assignor to George Auer, Chicago, Ill.

Application December 28, 1939, Serial No. 311,290

7 Claims. (Cl. 210—178)

This invention relates to filter apparatus of the general type disclosed in the U. S. Patent No. 2,322,428, issued June 22, 1943.

Some of the improvements contained in the present case, over and above the system and apparatus shown in the above noted patent, may be briefly noted as follows:

One object of the invention is concerned with the provision of a new and improved filter pan or bed wherein the liquid is forced to take a path directly toward and terminating in a collecting portion provided with an outlet.

Another object is concerned with a filter receptacle of this type, constituting a filter bed within a filter tank which is held in position with its outlet in leakproof connection with an outlet orifice in the tank walls by pressure applied to the frame of the filter bed at a point opposite the outlet.

A further object has to do with a novel arrangement of circular filter pans on a central column in such a manner that liquid to be filtered is admitted into the pans peripherally from the outside thereof, and after flowing through filter material within the pan is conducted to an outlet connecting with this central column. In one embodiment, this central column may be a tubular member, in another embodiment a member having longitudinal grooves forming conduits when assembled with the filter beds.

Still another object of the invention has to do with the provision of a filter for using some or all of the above noted improvements and arranged so that a specified quantity of liquid may be filtered in a time unit without the need of pumping means or the like for providing pressure.

Other objects and features of the invention relate to improvements connected with the tank itself and its mounting, as well as to various modifications of the interior tank and filter mechanism.

The invention and the above noted as well as additional objects and features will be better understood from the detailed description which follows with reference to the accompanying drawings. In these drawings, Fig. 1 shows a perspective view of a new rectangular-shaped filter pan for use as a filter bed within a system;

Fig. 2 represents a section through the new pan taken along the line 2—2 in Fig. 1;

Fig. 3 illustrates a filter tank provided with inlet and outlets containing a number of filter beds or pans of the structure shown in Figs. 1 and 2;

Fig. 4 is a somewhat schematic section showing an alternate arrangement of pans within a filter tank;

Fig. 5 illustrates schematically a modification of the pan or filter bed shown in Figs. 1 and 2;

Fig. 6 illustrates a circular filter bed or pan constructed interiorly along the lines of the square pan structure shown in Figs. 1 and 2;

Fig. 7 is a section through the circular pan along the line 7—7 of Fig. 6;

Fig. 8 represents schematically an assembly of parts constituting a simple filter system;

Fig. 9 is a section through a circular tank showing filter pans or beds of novel construction arranged centrally thereof;

Fig. 10 is a sectional view of a modified structure of circular filter pans arranged as shown in Fig. 9; and Fig. 11 is a sectional view of a supporting column which may be used in place of the tubular column shown in Fig. 10.

Like parts are indicated in the drawings by like reference numerals. Elements that may be assumed to be well known will be described only to the extent necessary for conveying an understanding of the invention.

Referring now to the drawings, Fig. 1 shows a new square filter pan for use, of course, in a substantially square tank. The pan is made of sheet material and has the upright sides 11 and 12, a tapering or downwardly sloping front end 13, and a straight rear end 15. The upper end 16 of the rear wall 15 is bent inwardly to provide a receding lip, while the portion 17 drops from or protrudes from the level of the substantially straight section 18 of the bottom. A bushing having a shoulder 19 and a nipple 20 is attached to the dropping central portion of the bottom and constitutes the outlet from the pan. It is understood, of course, that an orifice is provided in the frame of the pan at the place where the outlet bushing is attached. The end of the bushing may be slightly tapered, as indicated at 21, so as to connect in a leakproof engagement with a gasket provided in a fixed orifice of an outlet bushing secured in the tank wall, as indicated in Fig. 3. The front end 13 of the pan is made sloping or tapering downwardly so as to provide for an inlet of the liquid into each of the several pans in the tank in a manner subsequently to be described. A handle such as 14 may be secured to the pan in order to facilitate its removal from the tank, for example, for cleaning. Within the pan and circumferentially disposed along the bottom edges thereof are suitable square or, rather to say, rectangular strips, such as indicated in Fig. 1 by the numerals 22 and 23. Similar strips are, of course, disposed at the bottom edge along the walls 12 and 15. The strip along the bottom edge of the rear wall 15 is indicated in Fig. 2 at 24. It bridges the cavity 25 which results in the central collecting and outlet portion of the pan due to the central dropping of the pan bottom at 17. The filtered liquid collects in this cavity and is conducted through the outlet bushing into the corresponding outlet member of the tank.

The above noted strips, such as 22, 23, 24, which are disposed peripherally along the bottom edges of the filter pan, constitute holding members for the placement of spacer and supporting rods such as shown in Fig. 1 at 26. The diameter of these rods or the height thereof determines the depth of the collecting space in the bottom of the filter pan which feeds the liquid to the outlet. The ends of these rods may be suitably anchored within or on the oppositely disposed bars 23 and 24. This bottom space, within which the filtered liquid collects, opens toward the rear wall of the tank into the collecting cavity 25. The lowermost point of this cavity is at the center point where the outlet bushing is attached, and the cavity slopes gently toward either side of the pan, as is apparent from Fig. 1. A rough screen or filter member 27 is placed upon these rods 26 which form a grill-like structure in the bottom of the pan, covering these rods, the edges of the screen aligning with the upper edges of the bars 22, 23, 24. A fine filtering screen 28 is disposed on top of the entire structure and is attached to the bars by any suitable means, for example, by screws such as 29. Of course, if it is desired, this fine screen may be welded, soldered or suitably clamped to the supporting bars or strips. Clamping strips may be used under the screws 29 so as to attach the screen securely and evenly.

The way in which these filter pans are disposed in a tank forming filter beds therein is apparent from Fig. 3. The tank 30 is provided with an inlet 31 and a number of outlets 32-39, inclusive, one outlet for each filter bed, and all outlets terminating in a single common outlet 40. Each of the individual outlets may be provided with an outlet valve, and the common outlet with valves 41 and 42, the latter connecting with the indicator or gauge 43. Eight individual outlets are shown in Fig. 3, indicating that in this assembly it is assumed that eight filter beds are provided, but it is understood that this is noted merely for the purpose of description, inasmuch as the number of filter beds is a matter of choice and certain conditions that may have to be complied with in any given case. The inlet 31 is connected with a pipe 44 and the valve 45. A flexible connection may be attached to the structure connecting with mixing apparatus and liquid supply apparatus in the manner shown in the previously noted pending application.

The top of the tank carries a flange indicated by the numeral 46 and attached to the under side of this flange along each side of the tank wall are journal members, such as 47, 48, 49 for rotatably holding a shaft 50 from which project the threaded extensions 51—54. The lid 55 of the tank carries a flange 56 provided with suitable notches or cavities for receiving the shanks of the threaded members 51—54 in closed position. Nuts and washers complete the assembly. The advantage of this structure is that a plurality of screws are carried on a common rotatably hinged shaft which can be swung into closed or open position whenever desired or necessary. This structure is more efficient and more convenient than the use of individual screws or bolts for tightening the flange of the lid to the flange of the tank.

It is desirable and in many cases necessary that the tank be fully drained. This is attended with difficulties in a structure calling for horizontally placed filter pans or beds. In order to facilitate the draining of the tank by tipping it downwardly at the outlet end, I have provided rails such as 60 at the bottom on opposite sides of the tank, the forward end of each rail being curved as indicated at 61. This curvature is somewhat off from the center line of the tank, and the two rails rest on the base plate 62 supported on the legs such as 63—64. The pipe 44 extends through an opening 65 in the base plate 62 which is large enough to permit displacement of the pipe. At one end is provided an apron 66, while the opposite end of the base plate drops downwardly, as shown at 67. The common outlet may also be connected to a flexible pipe or base just like the inlet 45/44. A relatively slight pressure on the outlet end of the tank will tip the tank along the curvature 61 of the rails 60 as on a pivot, disposing the entire tank on an incline and therefore positioning all of the filter beds or pans with their outlets at the lower level than their inlets. The pans therefore will easily drain into their individual outlets. The T-bars shown at the bottom of the tank are supporting members. Circular, ring-like reinforcing supports may, of course, be provided on the tank, if desired, or if required by the pressure used for effecting the filtering.

Inside of the tank at the left end thereof is provided a vertically disposed strip or bar 70. A plurality of such bars may be provided if desired. The thickness of this bar or bars determines the inlet space for the pans. A few of these pans, numbered as 12 and 71—73, are shown in Fig. 3. It will be seen that the lowermost pan simply rests at the bottom of the tank, while the other pans, being of like construction, are supported circumferentially each by the pan underneath. Each pan attaches with its outlet to a gasket within the outlet orifice of its individual outlet pipe. The forward sloping end of each pan is in edgewise connection with the bar or bars 70, and inasmuch as the sheet material of the pan is somewhat resilient, a pressure will be exerted at this forward end which is propagated rearwardly to provide for the tight leakproof fit of the outlet against the corresponding gasket in the individual outlet pipe.

The operation of the system, as shown in Fig. 3, is as follows:

Filter material is mixed with the liquid in a separate tank and is admitted through the valve 45/44 into the tank 30. The liquid rises along the spaces between the bars 70 and the tank wall, successively flooding the pans, flowing into the pans over the sloping forward edge such as 13. When the tank is filled with the liquid-containing filter material in comminuted state, the valve 41 can be opened and the filtered liquid will drain from the common outlet 40 connected by the individual outlets 32—39 with the corresponding pans or filter beds. The liquid is filtered through the screens in each filter bed downwardly into the filter space and outlet cavity 25 in each pan, and in this process the comminuted filter material which was previously mixed with the initially introduced liquid precipitates on the fine screen 28 in each filter bed. The liquid to be filtered is then admitted in the same way and gradually enters these filter beds and filters through the precipitated filtered material thereon and therethrough into the filter spaces of the pans, and from there to the outlets and to the common outlet 40.

The essential features included in the structure so far described reside in the structure of the filter pans or beds, the filtered liquid being conducted positively toward the outlet which is at a lower level, that is, toward a common collecting space and the outlet which is located at the lower level of the centrally disposed collecting space. Additional features are directed to the attachment of the lid of the tank as well as to the mounting of the tank, which permits a tipping thereof so as to effect an efficient draining of the filtered liquid from all the filter beds.

The modification shown in Fig. 4 is concerned with an assembly of filter pans substantially constructed along the lines of the one shown in Fig. 2 which, however, are arranged within the tank on an incline so as to assure a constant efficient draining of all the pans through the individual outlets into the common outlet. The tank walls are indicated at 75—76; 77—81 are the filter pans; 82 indicates the upright strip or bar provided within the tank and corresponds to the bar 70 shown in Fig. 3; and 83—87 indicate the individual outlets for the various pans. The arrows on the left side indicate the flow of liquid into the pans. The internal structure of the pans or filter beds may follow the structure of those already described.

Fig. 5 shows a further modification of a filter pan 90 with a sloping or inclined front wall 91 and a straight rear wall 92. This pan also can be constructed similar to the one shown in Figs. 1 and 2, with a centrally dropping draining or collecting space, the lowest point of which is located at the point of an outlet bushing 93, with the only difference that the rear wall 92 is cut intermediate of the walls 90 and 94, omitting the lip 16 shown in the previously described structure. This pan can be located within a tank just like the pans in the tank shown in Fig. 3, the downwardly sloping draining end of each pan being then accommodated by the cutout resulting from the rear wall 92 of the pan underneath. The leakproof connection of the outlet bushing with the corresponding tubular outlet is again obtained by the resilience of the front wall 91 of the pan pressing against a strip or strips such as 70 or 82, which are provided inside of the front wall of the tank. The pans, however, will be flooded in this particular case, not only from the sloping front ends but also through the cutouts in their reduced rear walls. If desired, the front end, as a matter of fact, may be perpendicular. This particular pan structure may be used, for example, in a system for filtering water or any other liquid where waste is not an important factor to be considered.

Fig. 6 shows a transverse section through a circular tank looking down at a circular pan which is constructed somewhat along lines of the square pan shown in Fig. 1, and Fig. 7 shows a section through this circular pan along the line 7—7 in Fig. 6. 100 is the tank wall; 101 indicates the upper edge of the filter pan, this edge receding at the front and at the place indicated at 102 where it contacts the vertically disposed inlet spacer strip or bar 103. The latter spaces this receding edge of the pan from the tank wall, leaving a space for the flooding thereof by the liquid rising from the bottom of the tank, as described previously. The front wall 104 of the pan slopes inwardly and downwardly just as in the case of the filter pans already described. Pressed out from the bottom 105 are ribs 106—121, these ribs being in the nature of corrugations pressed out from the material of the bottom 105. As seen from the drawings, these ribs extend from the periphery of the pan bottom or a point near thereto toward the center thereof, that is, in the direction of the center line where the collecting cavity 125 is located. This cavity, in a manner similar to that of the previously described filter pans, is on a lower level and is connected with the outlet bushing 126. This bushing, as seen in Fig. 7, connects with a gasket 127 arranged in a bushing fixed in the tank wall 100 and connected with the tubular outlet 128. The pan wall 101 is partially bent inwardly to provide the lip 130 overhanging the pan and providing a space which will accommodate the dropped rear portion 125 of the pan located above it in the tank assembly. Disposed circumferentially along the bottom edge of the pan is a mounting strip 131 for the attachment of the fine screen 132 in the manner previously described in connection with the pans shown in Figs. 1 and 2, for example, by means of screws 133—136. A gasket-like strip may be used under the screws if desired. The attachment may also be made by welding or soldering or in any other suitable manner. Underneath the fine screen 132 is located the rough or coarse mesh screen 137, its peripheral edge aligning with the edge of the mounting strip 131. The coarse mesh screen rests upon the ribs protruding from the bottom of the pan. The liquid is filtered in this case through the filter material precipitated in operation upon the fine mesh screen and through this screen and then through the rough mesh screen down into the collecting channels resulting from the arrangement of the bottom ribs which direct the filtered liquid toward the center and rearwardly into the collecting cavity 125 which, as noted before, is on a lower level than the pan bottom.

In the above described structure, the pans or beds rest one on the other; that is, each pan as described rests peripherally on the pan underneath. In order to secure the positioning of the pans, each pan may be provided with lips or ears attached to or formed from its walls, the ears being disposed horizontally and extending from the upper edge of the walls to the inside so as to provide resting points for the pan that is to be placed thereabove.

The filter system shown schematically in Fig. 8 includes the tank 140 with its individual outlets 141, one for each pan or filter bed within the tank, the outlets connecting with the common outlet 142 having a drain valve 143, a drain spout 144 and an outlet spout 145 provided, if desired, with the valve 146. The inlet 147 of the liquid to be filtered is again arranged on one side at the bottom of the tank and may be provided with a valve 148. The inverted T connecting member 149 connects the inlet with the inlet pipe 150 and with the mixing valve 151, the latter being connected with a container shown in the shape of a funnel 152 for receiving liquid intermixed with comminuted filter material. Numeral 153 indicate an inlet control which may comprise or may consist of a body having a predetermined orifice placed in the path of the liquid so as to admit during a specified time a predetermined quantity of liquid into the tank 140 for filtering, assuming a certain pressure of the liquid. This orifice member may be removable and may be replaced by either a larger or a smaller orifice, depending on whether it is desired to increase or decrease the capacity of the system. Numeral 154 is the inlet valve. The system is started by mixing comminuted filter material, for example, shredded asbestos, with liquid in the container 152 or mixing the material separately and supplying the mixture to the funnel 152, and admitting it into the tank 140 through the valves 151 and 148. The filter beds within the tank will be flooded, as previously described, depositing the filtered material upon the fine mesh screen. When this is completed the valve 151 is closed and the valve 154 is opened, admitting the liquid to be filtered. The pressure of this liquid, for example, water, which may depend on the water system of any given locality, will be admitted through the control orifice 153 and will enter the tank. The advantage of this system is in its simplicity, which adapts the system for household use or for office or commercial use within certain limits. The filter material to be precipitated upon the filter beds may be mixed in the container 152 with chlorinated water, and therefore the filter beds themselves will be covered with sterile filter material which will have a sterilizing effect on the water admitted through the inlet valve 154. The mixing container has been shown as a funnel but may, of course, have any other desired shape and structure equipped with or without mixing means.

The filter unit shown in Fig. 9 is of the circular type comprising, for example, a cylinder which may be made of glass, indicated by numeral 160, closed at the top by the plate 161 and at the bottom by the plate 162. The entire assembly may be held together by means of the peripherally attached rods such as 163—164. The inlet of the liquid to be filtered is shown located centrally in the bottom plate 162 and is designated by the numeral 165. If desired, the inlet may be through the top plate 161, but in this case the liquid should be conducted downwardly by way of an internal conduit to the bottom of the tank before being allowed to rise therein and to flood the filter pans. The filter beds or pans are centrally arranged one above the other in a single column atteached directly to the top closure or lid 161 by means of the cap 166 and the nut 167 holding the tubular central member 168 in tight engagement with the closure 161 through the medium of suitable gaskets 169 and 170. The assembly comprises individual tubular threaded members, one attached to the other by threaded connections and with the filter pans clamped therebetween in superimposed position. At the bottom of the assembly is the nut 171 attached to a threaded connection 172 of a tubular member having an enlarged disk-like central portion 178 and a threaded top extension 173 which in turn is threaded into the tubular extension 174 of the next successive holder. Each of these holders is provided with radial channels 179 through which liquid is drained from the corresponding filter bed into the central outlet column formed by the assembly.

The pan is circular having the upright wall 175 which is reduced at the bottom, forming a circular step 176 for the peripheral attachment of the circular fine mesh screen 177. The screen is circularly cut out in the center and is attached thereat to the disk-like portion 178 of the corresponding tubular threaded member having the extensions such as 172 and 173. This widened portion 178 is serrated radially, as indicated at 179 (in the manner of a bevel gear) with holes 180 drilled centrally through the depending threaded extension 172 forming the outlet channels. These holes and the radial serrations 179 thus constitute the center drain apertures for the pan and connect with the bottom collecting space thereof, which may be constructed similar to the one shown in Figs. 6 and 7 with the exception that the ribs pressed out from the bottom of the pan as indicated in Fig. 9 by the numerals 182—183 extending radially from the center so as to conduct the liquid radially toward the center as it flows through the filter medium deposited on the fine mesh screen 177 and then through this fine mesh screen and through the coarse mesh screen 184 into the collecting space. From there the filtered liquid will flow through the serrations on the disk-like portion 178 of the tubular connecting member and through the holes 180 into the common outlet extending upwardly and terminating finally in outlet 185 at the top of the filter. It should be observed that the bottom of the pan or bed slopes gently downwardly toward the center, the slope being very much exaggerated in the drawings. In a practical embodiment the slope can be very much slighter than as shown. The closure cap 171 presses the lowermost pan against the extension 174 of the next successive connecting member and a gasket 186 provides a leakproof connection. The next connecting member for the attachment of the pan 190 is constructed similar to the one having the two threaded extensions 172—173 and the enlarged central portion 178 providing for an attachment of the pan 190 in a similar manner. The attachment of this and of the remaining pans is not described in detail, in order to avoid repetitions. It should also be observed that the filter area of these circular pans is utilized to the fullest by the provision of straight peripheral walls and a step-like bottom edge section for the attachment of the fine mesh screen. In common with previously described filter pans, this last described pan is provided with means for positively draining into a centrally located outlet which may be disposed at a lower level than the pan bottom.

The modification shown in Fig. 10 consists in a construction and arrangement of parts for a filter like the one shown in Fig. 9, but dispenses with the complicated, and therefore expensive, threaded parts. Each pan is equipped with a central hollow connecting member which is a fixed part of the pan and can be pushed into place on a tubular central member. When all pans are pushed or threaded, as it were, upon this tubular member, they will be clamped in place by a single screw cap attached to the bottom thereof. The central tubular member is indicated by the numeral 200. It may be fastened at its upper end to the lid or cover member of the tank such as 161 shown in Fig. 9, and depends therefrom centrally. Radial holes or apertures, such as 201—203, are provided at predetermined places for draining the filter beds which will be located properly on the hollow stem 200 after they are all put in place and tightened by the screw cap 204.

The lowermost pan 205 in this assembly is again constructed somewhat along the line of the pan 175 or 190 in Fig. 9, having straight walls with a step 206 and a gently sloping bottom 207. To the bottom is attached the tubular connecting member 208 which is individual to this pan and is provided with a bottom flange 209 and a top flange 210. The bottom flange is radially serrated, as indicated at 211, and the fine mesh screen 212 is attached to it, covering the coarse mesh screen 213. At 214 and 215 are indicated two of the radially extending ribs pressed out from the bottom 207 of the pan and determining the depth of the collecting space which drains through the central outlet serrations 211, forming in conjunction with the bottom of the pan apertures connecting with the outlet holes 203 in the central hollow column 200. The flange 210 of the connecting member 208 attaches to the bottom of the next pan 216 arranged above the pan 205. A gasket may be interposed at this place if desired or necessary. The pan 216 is provided with a connecting member 217 forming a part of the pan and being attached thereto and formed in similar manner as the connecting member 208. The flange 218 of the connecting member 217 will attach to the bottom of the next pan arranged above it. The pan 216 drains through the serrations 219 into the channels or holes 202 in the tubular central column 200. All other pans are constructed similarly and are similarly attached to the central hollow column.

The operation of this last described filter is, it is believed, self-evident, but may be briefly described as follows:

Liquid mixed with comminuted filter material is first admitted through the inlet 165. This inlet may be provided with a ball valve, if desired, in order to prevent back flow of liquid under certain conditions. The liquid rises within the cylindrical container 160 and successively floods the filter beds flowing over the rim of each filter pan in the direction indicated by the arrows. The comminuted filter material precipitates on the fine mesh screen in each filter bed, forming thereon a filter layer and the liquid seeps through the screens into the collecting space within each filter pan, and from there through the apertures formed by the serrated faces of the enlargements such as 178, or in the case of the embodiment shown in Fig. 10, by way of the openings formed by the serrations such as 219 and 211, and through the radial channel openings 203 and 202, respectively, aligned therewith. The filtered liquid then rises within the hollow column and finally leaves the container through the outlet. As the comminuted filter material is precipitated on the filter beds, the filtering proper can begin in a continuous process. If desired, the comminuted filter material may be admitted into the filter mixed with a sterilized liquid and will then have a sterilizing effect on the liquid to be filtered.

The structure shown in Figs. 9 and 10 may be simplified by the provision of a central holder having a cross section such as shown in Fig. 11, that is, channels formed by longitudinal grooves 230—233. These grooves will form longitudinal channels after the pans, for example, such as shown in Fig. 10, are attached thereto.

The inlet may also be provided in the top closure or lid and the pans may be attached to the bottom closure of the assembly, if desired, with a removable connection leading to the outlet. The latter may also be provided in the bottom of the apparatus and may connect with the central drain or outlet of the filter beds. The height of the pans shown in the last described figures must be chosen so as to facilitate the unobstructed inflow of liquid.

Any pan structure described herein may be employed in a system such as explained with reference to Fig. 8. In the case of the square or round pans with a sloping front wall in edgewise pressure engagement with an upright bar or bars in a tank, these bars may be provided with notches or grooves at the place of engagement with the pans so that the edge of each pan snaps into its place and is held therein in proper alignment and position.

Changes may be made within the scope and spirit of the appended claims wherein I have defined what I believe to be new and desire to have protected by Letters Patent of the United States.

I claim:

1. A filter comprising a normally upright tank, normally substantially horizontally extending vertically superposed filter beds disposed in said tank, means for admitting liquid to be filtered into said tank and thence to said filter beds, outlet means for normally removing filtered liquid from said filter beds while they are in their normal substantially horizontal position throughout the normal filtering procedure and mounting means for said tank including a base and rocking bars interposed between said base and the tank bottom for tipping said tank to dispose the filter beds therein at an angle so as to drain residual liquid through said outlet means from said filter beds which liquid would otherwise tend to remain therein at the conclusion of the normal filtering procedure.

2. A filter unit comprising a pan-like container having a closed bottom, said container having a cylindrical wall on one side joined to the bottom of the container and a tapered wall on the other side sloping outward from the bottom of the container, a layer of filtering material in said container, means supporting said layer in spaced relation to the bottom of said container to form a collecting space, and an outlet at the side of the container which has the cylindrical wall communicating with said collecting space.

3. In a filter, a cylindrical tank, a plurality of filter pans in said tank, each pan having an imperforate bottom and a wall joined thereto which includes a cylindrical section on one side merging into a lip section on the other side which tapers outwardly and upwardly from the pan bottom, the overall diameter of said pans being somewhat less than the inside diameter of said tank, individual outlets for said pans, outlets on the tank aligned with said pan outlets, and wedging means inserted between the wall of the tank and the tapered wall sections of said pans and effective to maintain the said pan outlets in connection with said tank outlets.

4. In a filter, a tank, a plurality of filter pans in said tank stacked one above the other with the bottom of each pan except the first resting on and supported by the sides of the pan beneath, each pan being smaller at the bottom than at the top as to one dimension so that the pans beneath the upper pan are not entirely closed against the entrance of liquid, a layer of filtering material in each pan, means in each pan supporting the filtering material in spaced relation to the bottom of the pan to form a collecting space, each said collecting space being increased in depth at one side by a depression in the bottom of the pan, the side wall of each pan being bent inward to receive the depression in the bottom of the pan above and thereby permit stacking of the pans, means for admitting liquid to the tank and thence to said filter pans, and an individual side outlet for each pan connecting with the collecting space therein at the point where it is increased in depth by the depression in the bottom of the pan.

5. A filter comprising a tank, a plurality of pan-like containers peripherally stacked one upon the other within said tank and forming therein a like plurality of horizontally extending vertically superposed filter units, each container having a bottom and side walls and each container being smaller at the bottom than at the top as to one dimension so as to form a lip over which liquid admitted into the tank can flow thereinto, the bottom of each container except the container forming the lowermost unit resting on the side walls of the container beneath, a collecting space at the bottom of each container, filter means covering each collecting space, an outlet for each container which is positioned in the side wall of the container on a level below the general level of the bottom thereof, means for admitting liquid into the tank so as to flood said containers over the lips thereof, and guide means at the bottom of each of said containers for conducting liquid from said collecting space positively toward said outlet.

6. A filter comprising a normally upright vertically extending tank, a plurality of normally substantially horizontally extending vertically superposed relatively shallow filter beds disposed in said tank, means for admitting liquid into said tank and thence to said filter beds to flood said beds, said liquid being admitted under pressure acting as a force to filter it through said beds throughout the normal filtering procedure while said beds are in their normal substantially horizontal position, outlet means connected with said beds for removing liquid thus filtered therethrough, means forming a mounting base disposed underneath said tank, and means forming a balancing support disposed between the tank bottom and said base, said balancing support tending to maintain the tank in its upright position by gravitational force acting thereon while permitting tipping the tank to tilt the filter beds therein so as to drain residual liquid from said beds through said outlet means which residual liquid would otherwise tend to remain in said beds in the absence of said pressure at the conclusion of the normal filtering procedure.

7. The structure and combination defined in claim 6, wherein said balancing support comprises a member extending from the outer edge of the tank bottom laterally toward and beyond the plane of the vertical axis thereof and resting upon said base, the inner end of said member being cut angularly downwardly in a direction extending laterally back toward the plane of the axis of the tank to form a rocking surface on which the tank can be tilted.

HENRY EICKEMEYER.